UNITED STATES PATENT OFFICE 2,621,128

DRIED HONEY-MILK PRODUCT

Byron H. Webb, Kensington, Md., and George P. Walton, Washington, D. C., assignors to the United States of America as represented by the Secretary of Agriculture No Drawing. Application April 21, 1950, Serial No. 157,414

7 Claims. (Cl. 99—146)

(Granted under the act of March 3, 1883, as amended April 30, 1928; 370 O. G. 757)

This application is made under the act of March 3, 1883, as amended by the act of April 30, 1928, and the invention described, if patented in any country, may be manufactured and used by or for the Government of the United States of America for governmental purposes throughout the world without the payment to us of any royalty thereon.

Dried honey-milk products, particularly those of high honey solids content, cannot be satisfactorily produced by conventional drying procedures. Shelf and drum drying methods cannot be successfully utilized because of the viscosity and hygroscopic properties of the partially dehydrated mixtures of honey-milk solids. Spray drying causes some loss of honey flavor, and it is exceedingly difficult to spray-dry honey-milk mixtures that contain honey solids in excess of 50 percent of the total solids content of the mixture.

We have found that honey can be converted to a non-viscous, granulated product which is readily dehydrated on subsequent drying, by contacting the honey with dried milk solids containing amorphous milk sugar under conditions causing the formation of crystalline lactose hydrate. When honey is thus combined with non-crystalline lactose the resulting mixture, containing lactose and dextrose in highly supersaturated solution, undergoes crystallization in the course of which each molecule of these sugars combines with one molecule of water of crystallization. As a result of the reduction of the free water content the mixture loses its viscous consistency as well as some of its hygroscopic qualities and acquires a granulated texture. The crystallized products thus obtained may be further dehydrated by conventional drying methods, and make available dried honey preparations suitable for use in the manufacture of foods, especially of prepared dry mixes, candy, and bakery goods.

In accordance with the method of our invention honey is mixed with any dried milk product containing lactose in non-crystalline or amorphous form, and crystallization of the resulting mixture is then allowed to proceed substantially to completion.

Mixing of honey with the dried milk product may be effected by any suitable procedure. The preferred method consists in adding the honey in finely divided form to the powdered dried milk product, with agitation and at such a rate that the honey is distributed throughout the mixture in relatively small particles which are completely coated by the dry powder thus obviating the formation of a sticky doughy mass. A satisfactory method of mixing is to allow the honey to drip or run slowly into the stirred powder, or the honey can be atomized into the powder by means of a suitable spraying device. As soon as the amorphous lactose of the dried milk product comes in contact with the moisture in the honey, crystallization of lactose begins to take place. Intermittent additions of honey with a holding period of suitable duration, may also be used, to avoid formation of a viscous mixture and the crystallization process may be accelerated by seeding with crystals of lactose and dextrose hydrate.

Any commercial honey of good grade can be used in the process. In making a product high in honey solids it is preferable to use honey with a moisture content of less than about 18 percent. A honey in which part or most of the dextrose has crystallized is superior to a non-crystallized honey because some of the free water has already been removed by the dextrose as water of crystallization. Suitable dried milk products include all those containing amorphous lactose. Thus dried whole milk, skim milk, or buttermilk, dried whey or mixtures of these dairy products may be used, those produced by spray-drying being preferred, since a light, fluffy powder of low density and small particle size can be more easily mixed with the honey than a densely packed powder. Also freshly made milk powders are preferable to older ones in which changes in the amorphous lactose may have occurred. Dried whey contains about 75 percent lactose on a water-free basis in contrast to the 50 percent lactose content of dried skim milk. The greater water combining capacity of dried whey makes it especially well adapted for use in our products. However, a dried whey in which the lactose is amorphous is very hygroscopic and is not the common form of commercial pack. The kind of milk product to be used in our process, whether dried whole milk, skim milk, buttermilk, or whey, depends largely upon the disposition of the resulting honey mixture in food manufacture, since these various milk products have special food uses.

The ratio of honey solids to milk solids in our products may be varied within wide limits. Best results are usually obtained when this ratio is 40:60 to 60:40 on the weight basis. However, satisfactory products are obtained with a honey solids-milk solids ratio within the range of approximately 10:90 to 70:30. We prefer to use the ratio of about 50:50.

Mixing of honey with dried milk products may be done over a considerable temperature range.

The optimum temperature for lactose crystallization is 86° F., while for dextrose it is 57° F. Our process can be operated at any temperature within this range, or at a higher temperature, for example up to about 110° F. We prefer to conduct the process at room temperature or about 70° F. The honey may be pasteurized and run into the dried milk product at pasteurization temperature. This will decrease its viscosity and facilitate its distribution in the powder. Under these conditions it is advantageous to keep the mix cool by using a kettle with a water cooled jacket.

Crystallized or partially crystallized honey may be incorporated with dried milk products by adding it gradually in small portions with continuous mixing. Machines such as those used by makers of pie crust doughs for incorporating shortening products with the flour may be used.

After the mixing the product is allowed to stand for a length of time necessary to permit crystallization to proceed substantially to completion, which is usually attained within about 24 hours.

The moisture content of the crystallized mixture is usually less than 10 percent. In this form it is suitable for prompt use in manufactured foods. If the mixture is to be held in storage for more than a week or two it should be dried by any conventional procedure to less than 4 percent moisture. Dried milk products with a moisture content in excess of 4–5 percent, darken in color, decrease in solubility and deteriorate in flavor during storage. If milk fat is present in the dried mixture it should be gas packed in cans in which the air has been replaced by nitrogen.

The following example is given as an illustration embodiment of a manner in which our invention may be practiced.

Three pounds of freshly made light, fluffy, dried skim milk (apparent specific gravity 0.2 to 0.3) was placed in a 5-gallon stainless steel kettle equipped with a double action stirrer. Five pounds of honey was added dropwise to the skim milk powder by drizzling it into the powder in several fine streams from a reservoir provided with one or more small outlets, at a rate of about 12 pounds per hour, with constant slow stirring. While the honey was being added the mixture was seeded with a trace of lactose and dextrose hydrates. Mixing was interrupted after the addition of each pound of honey and the mixture was allowed to stand without agitation for about 5 minutes to promote crystallization and reduce stickiness. Upon completion of the mixing operation the resulting product was spread in shallow trays and held at 70° to 86° F. for 16 hours to permit complete crystallization of the sugars. The trays were then placed in a tunnel drier held at 122° to 150° F. for several hours to complete the drying. The mixture may also be dried more rapidly by tumbling in a rotary tunnel drier. The dried product thus obtained, having a moisture content of about 2 percent may be ground if desired; however, this is usually not necessary if an advanced stage of crystallization is reached during the primary mixing process.

If a product with a higher proportion of honey solids is desired we proceed as follows: After the first 3 pounds of honey has been added, the mixture is allowed to stand for at least one hour at 70°–86° F. to permit further crystallization of the sugars. Mixing is then resumed and more honey is slowly drizzled into the mixture with short interruptions after the addition of each half-pound of honey. In such case the total quantity of honey added to the dried skim milk may be as high as 5.5 pounds. The mixture is then allowed to stand for several hours at 70°–86° F. and is then dried at about 122°–150° F. either in a shelf-drier or in a rotary tunnel drier.

Other dried honey-milk products are produced in an analogous manner by using dried whole milk, dried buttermilk, or dried whey in place of the dried skim milk of the foregoing example.

We claim:

1. A process for the preparation of a dried honey-milk product which comprises forming a mixture of honey with at least one amorphous lactose containing milk product of the group consisting of dried whole milk, dried skim milk, dried buttermilk, and dried whey, in the weight ratio of about 10 to 70 parts honey solids to about 90 to 30 parts milk solids and maintaining the resulting mixture at a temperature within the range of about 50° to 110° F. for a length of time sufficient to cause a significant proportion of the water in the honey to be sequestered by combining with the lactose and dextrose present to form crystalline sugar hydrates, thereby producing a dried honey-milk product which is firm, non-viscous and non-adherent.

2. The process of claim 1 wherein the milk product is dried whole milk.

3. The process of claim 1 wherein the milk product is dried skim milk.

4. The process of claim 1 wherein the milk product is dried buttermilk.

5. The process of claim 1 wherein the milk product is dried whey.

6. The process as defined by claim 1 wherein the mixture of honey and dried milk product containing crystallized lactose and dextrose is dried to a moisture content not substantially in excess of 10 percent and the dried mixture is then pulverized.

7. The process of claim 1 wherein the milk product is a spray-dried powder.

BYRON H. WEBB.
GEORGE P. WALTON.

REFERENCES CITED

The following references are of record in the file of this patent:

UNITED STATES PATENTS

| Number | Name | Date |
| --- | --- | --- |
| 1,409,435 | Barwell | Mar. 14, 1922 |
| 1,854,430 | Stratton | Apr. 19, 1932 |
| 2,014,902 | Lipson | Sept. 17, 1935 |
| 2,505,746 | Straub | Apr. 25, 1950 |